United States Patent
l'Anson

(10) Patent No.: US 8,291,077 B2
(45) Date of Patent: Oct. 16, 2012

(54) PROVISION OF SERVICES OVER A COMMON DELIVERY PLATFORM SUCH AS A MOBILE TELEPHONY NETWORK

(75) Inventor: Colin l'Anson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1210 days.

(21) Appl. No.: 11/331,858

(22) Filed: Jan. 13, 2006

(65) Prior Publication Data

US 2006/0161991 A1    Jul. 20, 2006

(30) Foreign Application Priority Data

Jan. 14, 2005    (GB) .................................. 0500716.6

(51) Int. Cl.
*G06F 15/173*  (2006.01)
*G06F 15/16*  (2006.01)
*G06F 15/177*  (2006.01)
*G06F 7/04*  (2006.01)
*G06F 17/30*  (2006.01)
*H04L 12/28*  (2006.01)
*H04B 7/00*  (2006.01)

(52) U.S. Cl. ........ 709/225; 709/217; 709/218; 709/219; 709/220; 709/221; 709/222; 709/223; 709/224; 709/226; 370/254; 455/410; 455/411; 455/524; 455/525; 726/2; 726/3; 726/4; 726/5; 726/6; 726/7; 726/8

(58) Field of Classification Search .......... 709/217–226; 370/229, 254; 455/411, 426.2, 524, 525, 455/410; 726/2–8

See application file for complete search history.

(56) References Cited

U.S. PATENT DOCUMENTS

| | | | |
|---|---|---|---|
| 5,586,260 A | 12/1996 | Hu | |
| 5,649,099 A * | 7/1997 | Theimer et al. | 726/4 |
| 5,819,092 A | 10/1998 | Ferguson et al. | |
| 5,907,607 A | 5/1999 | Waters et al. | |
| 5,915,019 A | 6/1999 | Ginter | |

(Continued)

FOREIGN PATENT DOCUMENTS

EP    0663750 A2    7/1995

(Continued)

OTHER PUBLICATIONS

GB Search Report dated Apr. 21, 2005.

*Primary Examiner* — Asad Nawaz
*Assistant Examiner* — Kai Chang

(57) ABSTRACT

One embodiment of a system for providing services to subscribers of a network supports the provision of a plurality of different services to multiple subscribers. A processor arrangement is provided for hosting the different services. A data structure is provided for storing data associated with subscribers of the system, wherein data associated with subscribers of the system comprises a plurality of sets of data, each set of data relating to a respective level of authentication. A trust model comprises a set of relationships between the sets of data, and the trust model determines the access rights of subscribers to different services in dependence on the data set which has been used to authenticate the subscriber in a given subscriber session. The use of this trust model enables services and other access rights to be provided to a subscribed which match the level of authentication which has been applied to the subscriber during any particular session.

19 Claims, 6 Drawing Sheets

U.S. PATENT DOCUMENTS

| | | | |
|---|---|---|---|
| 6,144,959 A | 11/2000 | Anderson et al. | |
| 6,338,088 B1 | 1/2002 | Waters | |
| 6,393,481 B1 | 5/2002 | Deo | |
| 6,396,911 B1 | 5/2002 | Kostan et al. | |
| 6,668,322 B1 | 12/2003 | Wood et al. | |
| 6,701,366 B1 | 3/2004 | Kallas et al. | |
| 6,778,653 B1 | 8/2004 | Kallas et al. | |
| 7,020,697 B1 | 3/2006 | Goodman | |
| 7,062,565 B1 | 6/2006 | Ravindranath | |
| 7,302,402 B2 | 11/2007 | Callaghan | |
| 7,428,756 B2 | 9/2008 | Wookey | |
| 7,490,153 B1 | 2/2009 | Krishnan | |
| 7,664,829 B2 | 2/2010 | Yamamoto et al. | |
| 2002/0009079 A1* | 1/2002 | Jungck et al. | 370/389 |
| 2002/0010776 A1 | 1/2002 | Lerner | |
| 2002/0053020 A1 | 5/2002 | Teijido | |
| 2002/0157029 A1 | 10/2002 | French et al. | |
| 2003/0061404 A1* | 3/2003 | Atwal et al. | 709/328 |
| 2003/0101111 A1 | 5/2003 | Dang | |
| 2003/0163733 A1* | 8/2003 | Barriga-Caceres et al. | 713/201 |
| 2003/0225944 A1 | 12/2003 | Mousseau | |
| 2004/0002936 A1 | 1/2004 | Majumber | |
| 2004/0078424 A1 | 4/2004 | Yairi | |
| 2004/0128558 A1 | 7/2004 | Barrett | |
| 2004/0152451 A1* | 8/2004 | Park | 455/412.1 |
| 2004/0199787 A1 | 10/2004 | Hans | |
| 2004/0199794 A1 | 10/2004 | Philips | |
| 2004/0260949 A1 | 12/2004 | Aoki | |
| 2005/0010781 A1* | 1/2005 | Harper et al. | 713/182 |
| 2005/0021845 A1 | 1/2005 | Yasui | |
| 2005/0080768 A1 | 4/2005 | Zhang | |
| 2005/0198173 A1 | 9/2005 | Evans | |
| 2005/0234964 A1 | 10/2005 | Batra | |
| 2005/0240917 A1 | 10/2005 | Wu | |
| 2006/0021064 A1 | 1/2006 | England | |
| 2006/0053296 A1 | 3/2006 | Busboom | |
| 2006/0107335 A1 | 5/2006 | Frank | |
| 2006/0161616 A1* | 7/2006 | I'Anson et al. | 709/203 |
| 2006/0161619 A1 | 7/2006 | I'Anson | |
| 2006/0161991 A1 | 7/2006 | I'Anson | |
| 2006/0190539 A1 | 8/2006 | I'Anson | |
| 2006/0218651 A1 | 9/2006 | Ginter | |
| 2008/0051079 A1 | 2/2008 | Forsgren | |
| 2008/0077995 A1 | 3/2008 | Curnyn | |
| 2008/0120599 A1 | 5/2008 | I'Anson | |
| 2008/0209088 A1 | 8/2008 | Tasler | |
| 2008/0295159 A1* | 11/2008 | Sentinelli | 726/6 |

FOREIGN PATENT DOCUMENTS

| | | |
|---|---|---|
| EP | 0873025 A1 | 10/1998 |
| EP | 1187497 A2 | 3/2002 |
| EP | 1681832 A1 | 7/2006 |
| GB | 2422217 A | 7/2006 |
| GB | 2422219 A | 7/2006 |
| GB | 2422221 A | 7/2006 |
| WO | WO 96/15505 A2 | 5/1996 |
| WO | WO9716929 A1 | 5/1997 |
| WO | WO 01/69904 A1 | 9/2001 |
| WO | WO 03/062968 A1 | 7/2003 |
| WO | WO 03/100544 A2 | 12/2003 |

* cited by examiner

PROVISION OF SERVICES OVER A COMMON DELIVERY PLATFORM SUCH AS A MOBILE TELEPHONY NETWORK

CLAIM TO PRIORITY

This application claims priority to copending United Kingdom utility application entitled, "Provision of Services Over a Common Delivery Platform such as a Mobile Telephony Network," having serial no. GB 0500716.6, filed Jan. 14, 2005, which is entirely incorporated herein by reference.

TECHNICAL FIELD

This disclosure relates to the provision and use of multiple electronic services over a common delivery platform that is connected to a telecommunications network, such as a mobile telephone network or a broadband network.

BACKGROUND

There has been an explosive growth in the range of services which can be accessed using mobile telephony devices, such as mobile telephones and PDAs.

As the range of services grows, different standards and protocols are suitable for different classes of service. For example, a mobile telephone may be used to operate real-time services, web services and rich media services.

Real-time services typically implement well established telephony functions, such as call divert, messaging, call forwarding functions and ring back functions (to name a few). These real-time services are characterized by the fact that dynamic status information (such as whether or not a telephone is engaged at a particular point in time) dictates the functions to be implemented. These real-time services control the mobile connections in real time and are therefore synchronous in nature. A particular set of protocols and standards is appropriate for implementing these functions, for example signaling system #7 (SS7) and SIP interfaces which can be controlled from a JAIN SLEE type environment. The processor for implementing the functions will typically support state-based processing.

Web services typically implement more adaptive functions and can use a wide range of data resources from third parties. For example, web services can include banking services, shopping, notifications (such as sports and traffic news) and software download functions. There are two types of web services. Well-known operations on the internet are often called web services, these are content oriented operations. There is also emerging a more formalized service-oriented form; these web services are self-contained, modular business components that have open, Internet-oriented, standards-based interfaces. The standards behind web services were created out of the industry's need for standard and open protocols to link businesses together. With the emergence of more formalized web services, customers, suppliers, and trading partners can communicate independently of hardware, operating system, or programming environment. XML-based standards such as SOAP, UDDI, and WSDL enable web services to be easily published, located, and invoked over open Internet protocols like HTTP. Web services are asynchronous and are delivered on a best effort basis. Web services standards have been taken from a number of standards bodies. The emerging, more formalized, web services also need the ability to be discoverable at runtime and during development.

Standards for rich media services are currently being formulated, for example for high speed real time applications, such as processing of live image data, such as video streams. Implementation is typically with proprietary standards. These services will require the use of further protocols, standards and processing methods which are now emerging, for example vector oriented processing techniques.

It can be seen from the above that the range of different services and service types suitable for implementation using mobile telephony gives rise to many different environments for the creation of services and applications. Each of these environments requires programmers with different skills and software tools, and a highly distributed, non-homogenous environment results.

The access for users to the different services hosted by different service providers also gives rise to a complicated user access environment, as access to different services will be based on different access policies, typically based on the identity of the user. Individual users can have many different identities (such as passwords, usernames). One solution is to use a federated identity scheme, in which different service providers accept each others' authentication of a user, so that a single sign on (SSO) operation can be carried out by the user to enable the user to browse between different services of different service providers. Single sign on schemes are known for implementation typically in a web container. There are also many different types of application programming interface, for example CORBA based, Java based and .NET based.

SUMMARY

According to one embodiment, there is provided a system for providing services to subscribers of a network, wherein the system supports the provision of a plurality of different services to multiple subscribers, and comprises: a first processing unit which provides a first execution environment for a first set of software applications for providing respective services; a second processing unit which provides a second execution environment for a second set of software applications for providing respective services; a data structure for storing data associated with a plurality of subscribers of the system, wherein data associated with each of said plurality of subscribers of the system comprises a plurality of sets of data, each set of data relating to a respective level of authentication; and a trust model comprising a set of relationships between the sets of data, wherein the trust model determines the access rights of subscribers to different services hosted by the different processing units in dependence on the data set which has been used to authenticate the subscriber in a given subscriber session.

One embodiment of the invention also provides a method of controlling access to services provided by a network operator, the network operator using a system which supports the provision of a plurality of different services to multiple subscribers, the system comprising a first processing unit which provides a first execution environment for a first set of software applications for providing respective services and a second processing unit which provides a second execution environment for a second set of software applications for providing respective services, the method comprising: receiving a service request from a subscriber for services hosted by one of the first and second processing units; interrogating a data structure which stores data associated with a plurality of subscribers of the system, the data associated with each of said plurality of subscribers of the system comprising a plurality of sets of data, each set of data relating to a respective level of authentication; using a trust model comprising a set of relationships between the sets of data to determine access rights of the subscriber to the service requested; and permitting or prohibiting access to the service requested based on the trust model and on the data set which has been used to authenticate the subscriber in the subscriber session.

BRIEF DESCRIPTION OF THE DRAWINGS

Examples of the invention will now be described in detail with reference to the accompanying drawings, in which.

DETAILED DESCRIPTION

Examples of the present disclosure provide a system for providing services to subscribers of a network supports the provision of a plurality of different services to multiple subscribers. A processor arrangement is provided for hosting the different services. A data structure is provided for storing data associated with subscribers of the system, wherein data associated with subscribers of the system comprises a plurality of sets of data, each set of data relating to a respective level of authentication. A trust model comprises a set of relationships between the sets of data, and the trust model determines the access rights of subscribers to different services in dependence on the data set which has been used to authenticate the subscriber in a given subscriber session. The use of this trust model enables services and other access rights to be provided to a subscriber which match the level of authentication which has been applied to the subscriber during any particular session.

An example of the application and service delivery system for a mobile telephony network is described below, which provides an example of an implementation of one embodiment of the invention. The example given has numerous novel features, and the scope of this patent is to be determined by the claims, which focus on certain of the aspects described below. It should be understood that one embodiment of the invention as claimed can be used in many different contexts, and it should not be assumed that all features of the system and methods described below are essential to the implementation of one embodiment of the invention as claimed.

Figure 1:
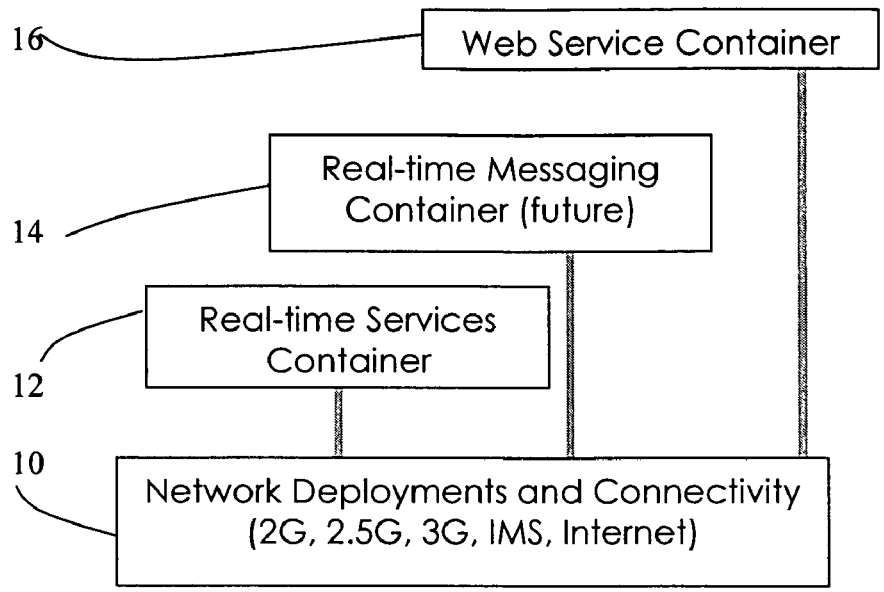
FIG. 1 shows how a multiple services environment for a mobile telecommunications application can be implemented using multiple containers for different applications and services.
Figure 2:
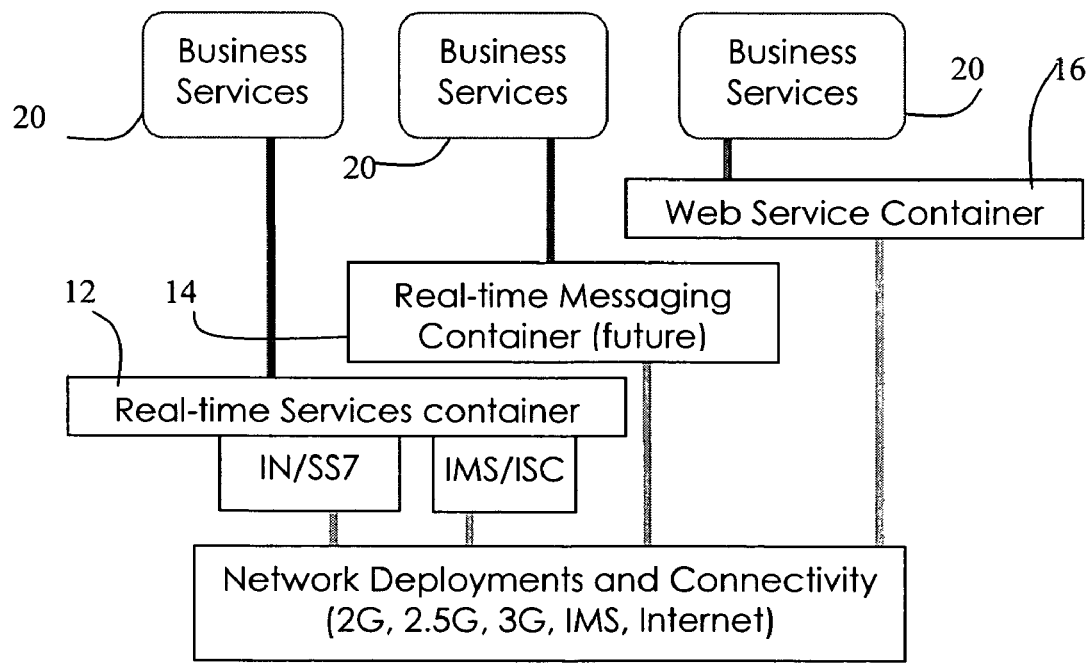
FIG. 2 shows additional details to the schematic diagram of FIG. 1.
Figure 3:
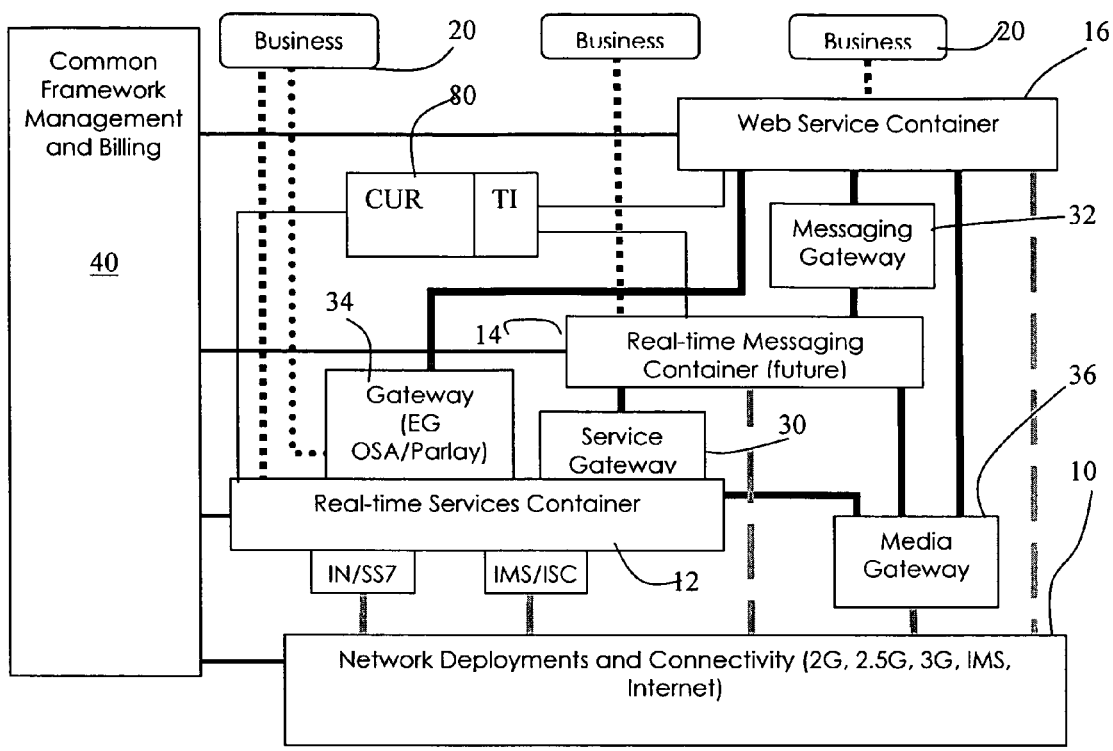
FIG. 3 shows an example of a system of one embodiment of the invention.

FIG. 1 shows schematically how different services and applications provided by a mobile telephone network operator are hosted in different containers. FIGS. 1 to 3 show parts of the architecture of a mobile network operator application/service delivery system. FIGS. 1 to 3 each represent parts of an application/service delivery system of a single network operator. Typically, the system serves one territory (country) only, although there may in practice be a single system serving multiple countries, or else multiple application/service delivery systems for an individual network operator may be provided within one such territory.

FIG. 1 shows three software containers where services and applications are hosted. A container is the execution environment for applications and application components, that use a set of common services and capabilities. The container uses standard APIs for service bindings and standard programming methods as well as interfaces to other systems. Each container supports a small number (typically 1) of application programmatic interface type, e.g. JAIN or web services. The particular services and applications in each container will be those most appropriate for the standard execution environment and protocols used by that container.

Unit 10 represents the network (for example 2G mobile, 3G mobile or fixed), and data is transferred between the network 10 and the network operator application/service delivery system. All physical data interaction with the network subscribers takes place using the network 10. As shown, the network 10 may be implemented using a number of different technologies, and this embodiment of the invention can be applied to conventional (or indeed future) mobile, broadband and fixed telephony networks protocols.

The Real Time Services container 12 hosts real time applications which typically depend on dial events of the subscriber equipment, for example a handset or software agent on a PC. These applications are therefore implemented using state-based techniques. Examples of the types of function implemented by applications hosted in the container 12 are conference functions, call forwarding functions, presence information gathering, push to talk over cellular functions (walkee talkee type multi-user operation), ring back functions and messaging functions. These functions are characterized by synchronous run-time functionality. These functions can be implemented in a high throughput, low latency event processing application environment, such as the Service Logic Execution Environment (SLEE) for example JAIN SLEE, which is the is the Java standard for a telecommunications SLEE.

Access to the services hosted by the container 12 may depend on the authentication using a SIM card or IP address supported by other credentials.

The Real Time Messaging Container 14 is an environment currently under development, for the streamed delivery of live rich media (i.e. video) content. Proprietary implementations are currently used, and standards are now beginning to emerge. This is expected to include the use of vector oriented processing environments.

The Web Services Container 16 hosts applications which involve increased interaction with third parties, and may typically involve user interactions for example menu based selections. The Web Services environment uses synchronous protocols and is a highly distributed environment, for example using J2EE and .NET application servers.

Access to the services hosted by the container 16 is typically permitted on the basis of identity which is verified through a registered password or by cryptographic means.

Each container can be implemented using a modular software approach, in which a particular application will call upon different software components, for example service enablers/resource adapters, and these may be shared between different applications. In this way, an application is operated by an orchestration process which runs logic using modular service enablers/resource adapters. An application may involve use of service enablers inside or outside the network application/service delivery system that is controlled by the operator. An application in a container may be itself made available for re-use by other applications. Applications can be created in a variety of ways including but not restricted to programmatic languages like Java and execution of business process languages like BPEL.

The architecture shown in FIG. 2 illustrates that each container hosts respective sets of business services unit 20. The sets of business service unit present the available functions and call upon service enablers in the respective containers to enable the business services to be executed. These business services are realized by orchestrations.

FIG. 2 also shows the Real Time Service Container interfacing with the mobile network using the signaling protocol SS7, and the SIP based protocols. SS7 is used for control of circuit switched networks, for example 2G mobile networks. ISC/SIP is used for control of packet switched networks, for example IMS.

The containers 12,14,16 are connected to each other through gateways, as shown in FIG. 3. As shown, gateways are provided between each pair of containers (a service gateway 30 between Containers 12, 14, a messaging gateway 32 between the Containers 14,16, a gateway 34 between the Containers 12,16, as well as a media gateway 36 directly between the network and each of the three containers. Each container also implements policy enforcement.

The gateways control the routing of data (such as requests for services) between the containers and can be used to provide policy control points. The different services hosted by the containers will typically have different access conditions, and the policy control points implement these conditions.

FIG. 3 also shows a common framework management and billing unit 40 which communicates with the containers and the gateways.

The architecture outlined above provides a simple structure, with different standards used in different parts of the structure, so that services and applications can be implemented in the most efficient manner.

The different containers may implement different access rights to third parties. For example, the Web Services Container may be preferred when allowing third parties to register services to the container, and this registration right may be reserved to the network operator. Use of service enablers by third parties (external to the network system) may also be through a gateway with different access rights.

Figure 4:
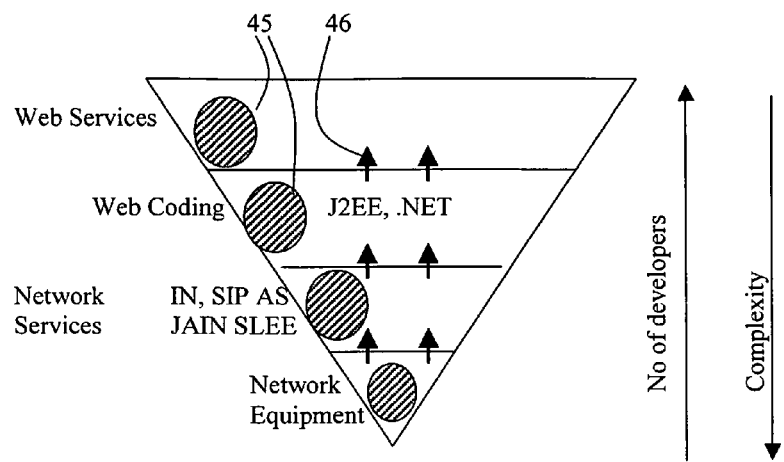
FIG. 4 is used to explain the software development environment.

FIG. 4 is used to explain how the execution environments associated with the different containers require the skills of different software developers. The inverted triangle of FIG. 4 illustrates that the Web Service Container operates using an execution environment which is understood by a large number of developers, and the required know-how and skills are relatively low. The different and standard protocols are shown along the vertical, and the width of the triangle illustrates the available number of developers. As a result of the different skills required by each level, different access conditions for different execution environments are desirable. Development of an application in one layer will also typically use resources from a lower layer and the layer itself. Resources from a lower layer can be accessed through a gateway. If a resource that exists in a higher layer is required, then the layer is accessed in the same manner as it would be typically used. This may require the developer additionally to have knowledge of the service binding method or methods in that layer.

The hatched regions 45 indicate where newly created services and service components are created. The arrows 46 also indicate schematically that service capabilities created in one layer can be exported to the execution environment above (i.e. to be available to more developers).

Each of the services implemented by the execution environments is associated with a respective (homogenous) service binding, which provides the set of rules governing the interface with the service, and defining the common structure of messages to be sent and received. Each service binding defines the way an API (Application Program Interface) is described, and is a specific class of API.

To enable more effective reuse of software components, and to facilitate the design and implementation of services for operation over the mobile network, a common service repository is provided.

Figure 5:
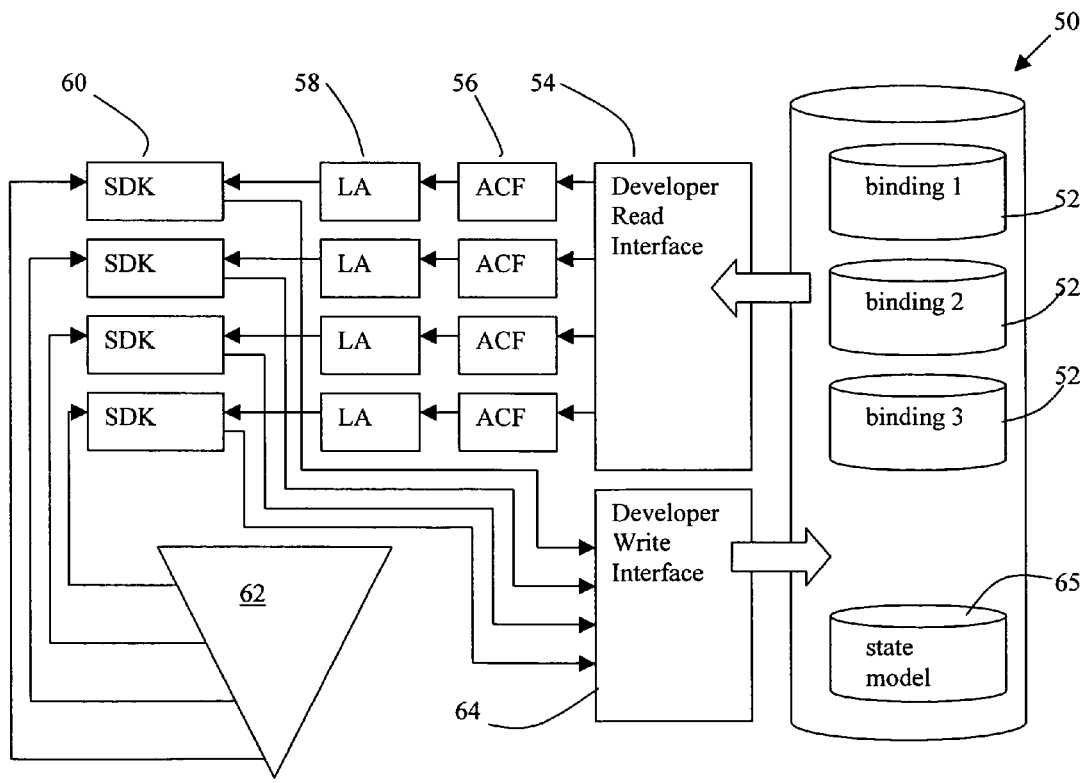
FIG. 5 shows a services repository of one embodiment of the invention.

FIG. 5 shows this common service repository and is used to explain how a software developer interacts with this repository.

The common service repository 50 may be an actual database in a single physical location, or it may be virtual and physically distributed throughout the system. The common service repository stores information about available completed applications and service components (namely service enablers/resource adapters), and these are registered so that they are appropriately indexed. Each application or service component entry includes an API or service binding, so that the repository includes multiple different types of service binding 52. The service repository serves all of the different types of execution environment, for example the three different types of execution environment defined by the containers in FIGS. 1 to 3.

In order to access the common service repository 50, a developer read interface 54 is provided. Access control filters (ACF) 56 control the output to the developer, and a library adapter (LA) 58 formats the output into a form suitable for a specific software development kit (SDK) 60.

By way of example, FIG. 5 shows the interface between four different software development kits 60 and the common services repository. As shown schematically in FIG. 5, each software development kit may be associated with a different development level of the structure of FIG. 4, which is shown schematically in FIG. 5 at 62.

The software development kits may for example use the following protocols and standards:
Web Services: HTML, XML, WSDL
Inter-network Integration: J2EE, .NET, CORBA
Network Services: IN, JAIN SLEE, SIP
Languages (Programming): Java, C#, C++

Each execution environment is associated with a different API or service binding, or set of APIs and service bindings. Data is stored in the common service repository according to the API/service binding. For example, a similar indexing structure may be used as in a conventional UDDI registry, of "white", "yellow" and "green" pages. The white entry provides service provider contact details, the yellow entry provides business details and the green entry provides technical interface details, such as the API identity and the location of the API.

Developers create their application or service in their selected standard software development kit, for example Borland JBuilder. The library of each SDK provides details of all available services and service enablers, obtained from the common service repository. The library of each SDK will contain a list only of the services and service enablers which can be exported to the SDK taking into account an access policy. A direct portal interface can also be provided to the common service repository (rather than through the SDK), again subject to access controls.

Once a developer has completed an application or service component, this can be registered in the common service repository using a developer write interface (portal). The hosting details can also be registered for use by subsequent hardware configuration and software redeployment management systems.

New services are loaded into the service delivery environment using the hardware configuration and software redeployment management systems.

An operator's service delivery environment will comprise one or more of the containers of the system architecture of FIGS. 1 to 3.

It can be seen that the common service repository contains a list of all the applications and services that a telecommunications operator can provide both internally and externally to the market through their various channels. Entries are provided for complete applications as well as application fragments and services that can be reused by other applications. The entries include the details of the programmatic interfaces of the application fragments and services.

The common service repository is structured taking into account the system architecture. For example, the architecture described above has three containers, each providing different execution environments. The common service repository can accordingly host entries relating to three service bindings (or three sets of service bindings), one for each execution environment. Multiple service bindings can be supported for a container, for example two containers may have just one type of service binding whereas the other may have two classes of service binding.

The common service repository enables all services and application fragments to be found in one location (or one virtual location) and also enables the details of respective service bindings to be discovered from the same location.

This also enables the discovery of simple services to be composed into higher level services, and enables the discovery of services for orchestration of services (namely organizing the flow of services) within a container.

Access to the common service repository is controlled so that different developers have different access rights to discover application fragments and services. Some will be limited by their development tools, and others may be limited by trust levels. For example, an internal developer will have greater access rights than an external developer. By updating service component libraries in the SDKs used by developers from the common service repository, developers can use the standard application creation tools they are familiar with.

The functionality of the common service repository can be enhanced by providing state information in the repository. FIG. 5 shows a state model 65, and this is explained further with reference to FIG. 6, which shows that the common service repository is provided with a service sequence database 66 which can provide additional information to the execution environment 68, particularly to a state-based service 69 of the execution environment.

The service sequence database 66 is used to describe relationships between the services. For example, one service may require another to be run before it can be run. One service may require that it is followed by one or more other services. The required logic is created through the write interface 64 and is saved in the service sequence part 66 of the common service repository, for access by means of the developer read interface.

Figure 6:
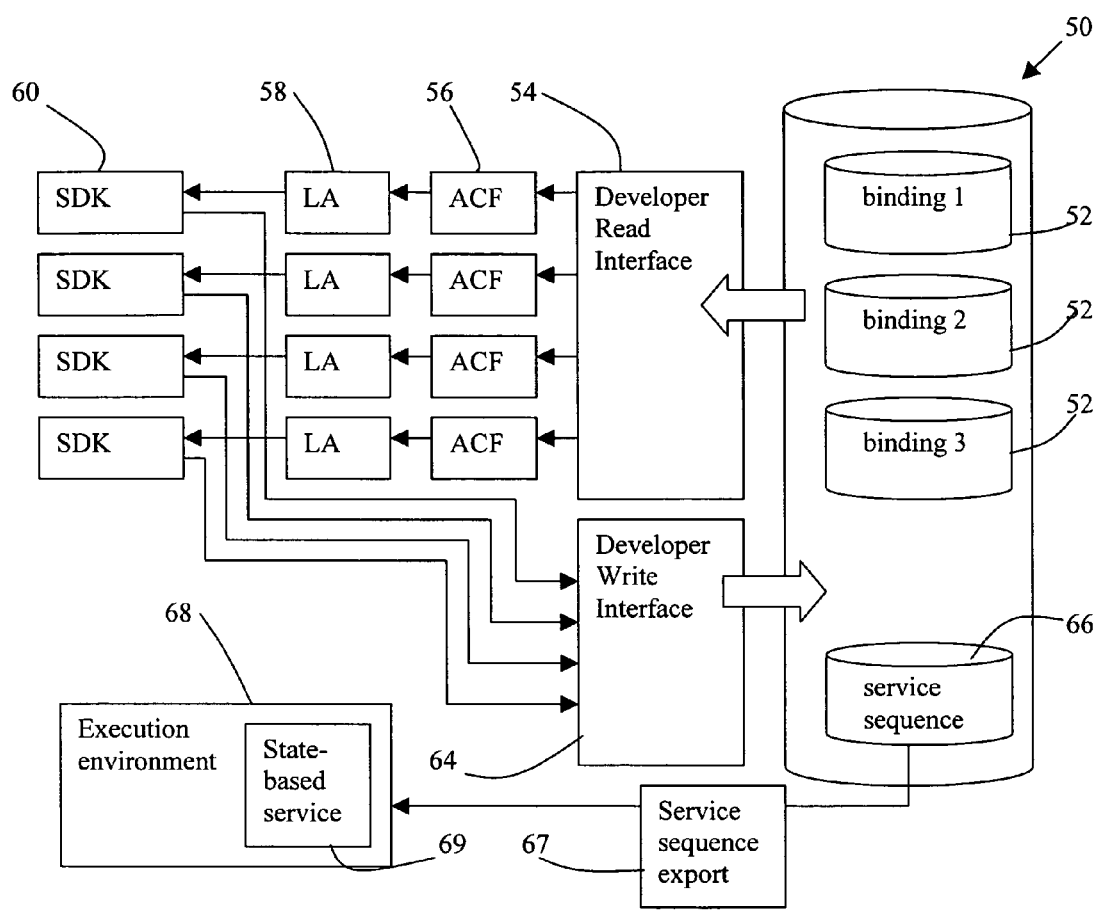
FIG. 6 shows a modification to the repository of FIG. 5.

As shown in FIG. 6, the service sequences can be exported by an export unit 67 to the execution environment 68 for use by a state-based service 69 of that target execution environment.

This state based information enables a state table to be formed for the services of the repository. This can be used both for verification (where the service sequence is known in advance) and for state based programming purposes using a state model. Examples of the type of applications which will have particular services which follow or precede are services implementing different ringback tones for different callers, or implementing push to talk over cellular functions.

The generation of a state model based on the different service components stored in the service repository enables state based programming to be used for sequencing the execution of service components, even when those components are created independently. The advantages of state based programming are well known. For example, the execution of software components is enabled without the risk of long term pausing of active processes blocking access or overloading the execution environment with parked execution threads.

By deriving a state table from the different software components in the repository, the entry of state related information is simplified, and a link is provided between the service creation tools and the execution environment. The common service repository thus draws together all of the resources for the creation of services in a most efficient manner.

As mentioned above, developers of the network operator can register services in the common service repository, and third party developers can also register services and service sequences.

Figure 7:
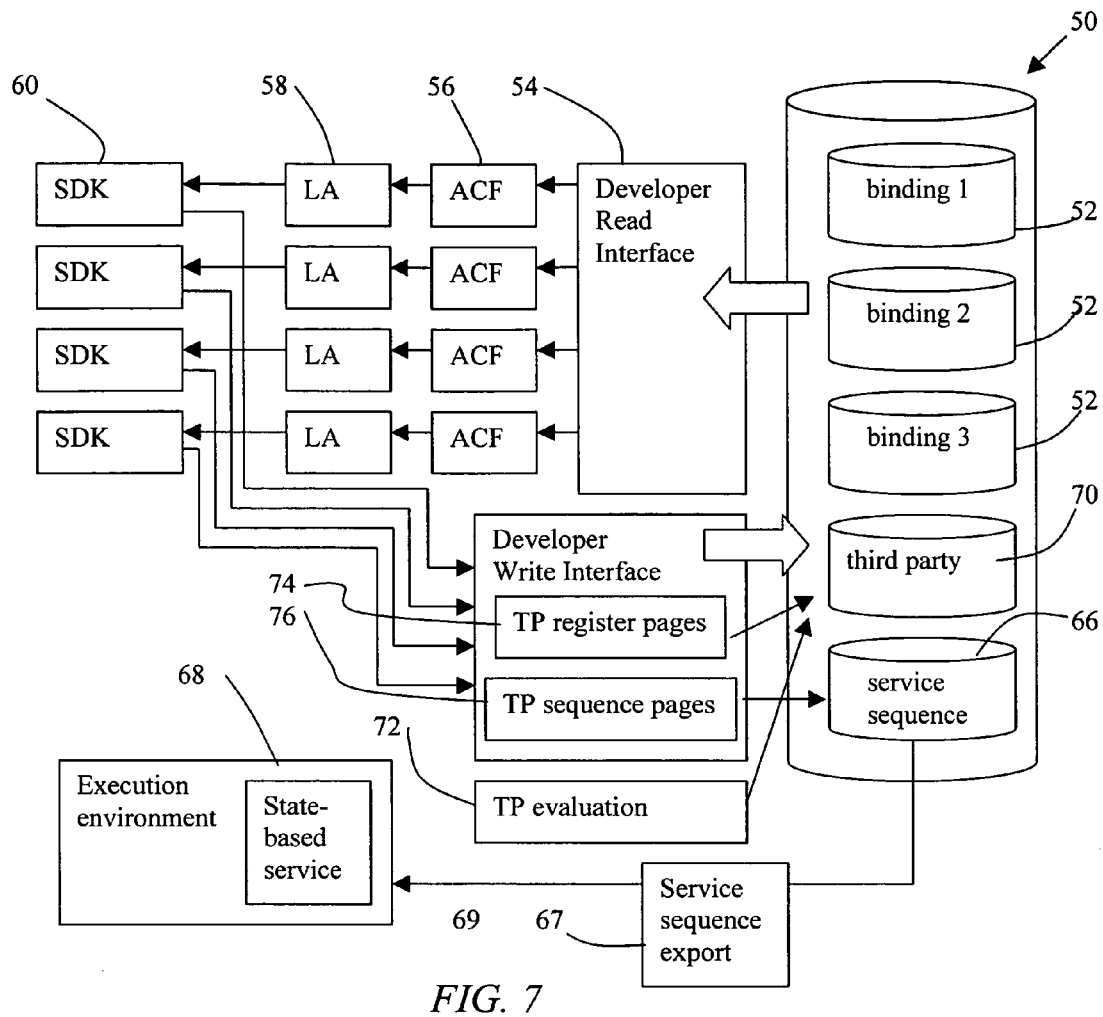
FIG. 7 shows a further modification to the repository of FIG. 5.

The third party services are not always made available to others immediately, and typically are first tested and the business relationship is first established. For this purpose, the service repository is provided with a third party quarantine area 70 (FIG. 7). The third party services and service sequences are quarantined while the services and business conditions are tested or finalized by a third party evaluation unit 72 (FIG. 7). Only then are third party service registry pages 74 (FIG. 7) and if required the service sequence pages 76 (FIG. 7) available for use by other developers.

As discussed above, there are many different execution environments in the system described. Different users will invoke (and be subscribed to) different services provided by the system. Access to the different services is typically permitted on the basis of the identity of the user. However, users may have many different identities relevant to different services (different passwords, account numbers, reference numbers, MSISDN number, etc), and this complicates the task of providing user authentication for the different services offered by the network operator.

To overcome these difficulties, the system is provided with a common user identity repository. This user identity repository provides a single identity system which the services may use, and draws together all the smaller pieces of information about an individual user held in disparate systems.

The common user identity repository may again be provided as a single physical entity (for example an Oracle database), or it may be distributed as a number of databases, for example with one in each container. The user identity repository is shown schematically in FIG. 3 as block 80 ("CUR"—common user repository).

When authentication of the user can be achieved, the CUR provides a single identity for users for all access to services within the system. Thus, regardless of the entry point of a user request into the control system, a common identity is applied to the request to enable all other parts of the system to which the request is routed to recognize the user and derive the access rights of the user. In one possible implementation this can be achieved by re-writing the http request header, or equivalent, of user requests with the user identity from the CUR. This task can be carried out by a traffic interceptor 82 (FIG. 8) associated with the CUR. All traffic such as service requests passes through the traffic interceptor.

This mechanism enables direct access to all data in the CUR without the need to cross reference multiple instances of the name of a user.

If the user cannot be authenticated, special identities can be applied depending on the access interface, for example unknown public user, trusted operator user and unknown developer.

Figure 8:
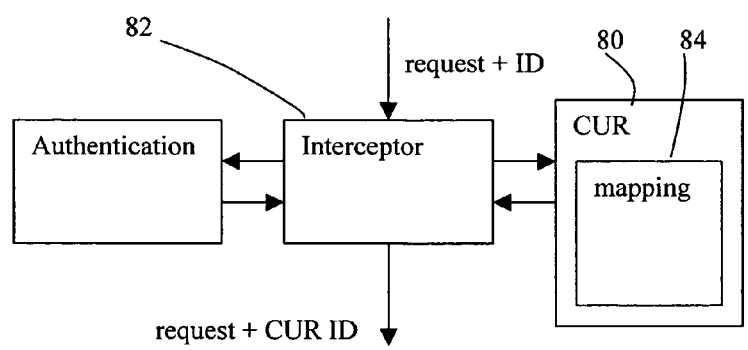
FIG. 8 shows how common user identity is applied to user requests.

FIG. 8 shows how the common user repository identity 80 is applied to requests as they enter the system.

The interceptor 82 intercepts any new request and checks if the requestor identity is on the authenticated list—typically forming part of the CUR and typically a locally cached copy. This list 84 provides a mapping of input IDs to the CUR ID. If an input is received from an already authenticated user, the CUR ID is placed in the request header, and the request is forwarded with the new CUR identity.

If the requestor identity is not recognized, an authentication function is implemented, and the previously unrecognized user ID is added to the authenticated users list and an existing or new CUR identity is added to the request as before.

The request has then entered the system, and while the request is within a trusted zone, the CUR ID is the only identity information needed to make service invocation requests.

However to increase security and access flexibility, each service can also be provided with a service interceptor. Upon receipt of a service invocation request, these check if the CUR identity is valid, and also if the user corresponding to the CUR identity has the required access rights. For example, a check may be made of the age of the user, the subscription status, whether the CUR is part of a group membership scheme etc.

A refinement to this system enables different levels of trust to be attributed to different information data. For example, a user may be authenticated to the common user repository in more than one way. There will exist a set of attributes about the user bound to the identity of the user, and examples of these are:

Billing entries including name, billing address, current and previous bills, credit limit, customer care records. This information can come from the user but also from credit agencies, for example;

Mobile phone SIM card identity (such as MSISDN);

Name and passwords for authentication of the user to a portal service;

A federated identity scheme supported by cryptographic authentication means enabling single sign on (SSO) for web services.

Other authentication systems can also be used, such as public key encryption/authentication.

These different information sources provide different levels of security and are established to provide different access rights. For example, a user name and password for access to a portal service may be to enable a set of web pages to be accessed which are customized to the needs of the user. The authentication process may not enable any billing operations to be carried out, and the level of security may be relatively low. It would therefore be undesirable for a user to gain access to higher security level information (for example access to credit limit information or bills) using this information.

In general terms, it would be undesirable to allow a weakly authenticated connection to be used to modify data associated with another level of authentication, or even to allow access over a weakly authenticated connection to that data. While hierarchical authentication schemes may be used, this is not required.

There is therefore a need for levels of trust to be built into the system even when a single user identity from the common user repository is to be used to provide a common identity of a user for all services.

Figure 9:
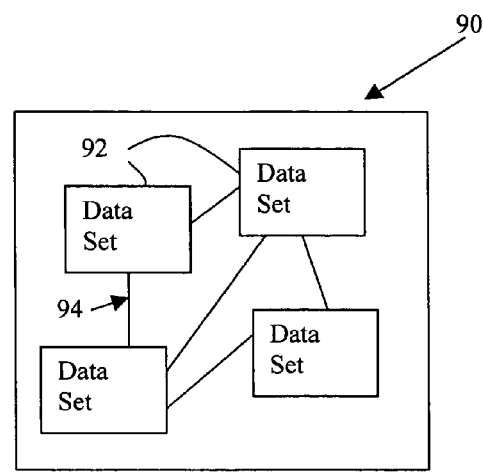
FIG. 9 is used to show a trust relationship between data sets associated with a user.

FIG. 9 is used to show how data relating to a single user 90 is grouped into a number of sets 92. Each set 92 contains the user attributes (i.e. information) from a specific source, which is associated with a particular authentication process. For example, a Web service may be invoked by a user who is authenticated by an email address and password, and this group of information provides a set 92 of data.

A set of data is considered "active" if the user has been authenticated using that data set 92 for the session currently in progress. The common user repository thus includes data fields associated with the different data sets, and these include timestamps to enable the active data set or sets to be determined. The active status of a user's authentication may also be retained in a service interceptor's cache which may itself be another portion of the common user repository.

The different sets 92 are linked by links in the form of trust relationships 94, and these links take into account a trust model that exists between the sets. These sets of information may form a simple hierarchy or a stack with progressively increasing levels of authentication associated with progressively increasing levels of trust. However, a mesh type trust relationship may instead exist as shown schematically in FIG. 9. The links are based on a mapping of the various authenticated identities of the user. These may show that further authentication is required before an application/user may safely imply attributes in the CUR are about the same user.

The different levels of authentication may for example comprise a simply identity request, identity and password, SIM or smart card identity, public key authentication etc.

The trust relationship between sets 92 may not be reciprocal, and a more complicated chain of trust relationships will be established.

When information from the common user repository is read out, written or modified, the trust relationship is used. Thus, the trust relationships can be used to implement a system in which:

read, write and modify actions on the common user repository can be subject to different authentication requirements;

information in one set can only be accessed based on authentication using the information of that set, or where a trust relationship from another information set permits this;

the trust relationships between sets can be read out (as well as previous trust relationships);

when attributes are read from the repository, the trust information concerning those attributes can also be provided.

The trust relationships together define a trust model, which is a software-implemented set of relationships between the different sets of data.

The manner in which a user has been authenticated to the user repository (which determines which data set is "active"), together with the trust relationships, can be used to determine the actions that may be carried out, namely services that can be invoked by the user and the access rights to information in the common user repository. System manager interfaces will additionally be provided permitting general access.

When a request is received from a user to invoke a service, if the authentication level which has been used to provide the common user repository identity, and the trust relationships, are not sufficient to allow access to the server, a response can be generated which requests further authentication.

An example will now be given with reference to FIG. 3.

A user dials in to the network, and this is by means of a connection to the network 10. This provides access to the real time services container 12 simply on the basis of the MSISDN of the telephone used. In a 2G network this was authenticated using the SIM card in the users mobile device.

The real-time services container accesses the common user repository to obtain the single user identity and adds this to the header of the request message. This access to the common user repository may for example be made by a Home Subscriber Server, (HSS) of the container 12.

The call may be directed to a number of a specific service, for example for purchasing music, and this service may be hosted by the web services container.

At this stage, it can be determined that the authentication level associated with the interaction with the user so far is not sufficient for the request to be routed to the purchasing application in the web services container. The common user repository may then require further information to provide authentication associated with the appropriate set of user data before the request can be routed to the web services container through gateway 36.

Alternatively, the level of authentication may be sufficient to allow browsing of the services provided. However, if a purchase request is made by the user, then further authentication will again be required.

There are a number of policy control points at which the "active" authentication level and trust relationship are used to determine if a request can be pushed forward. These are provided at each gateway. Furthermore, additional direct access routes into services may be provided for the network operator, and these portals (not shown in FIG. 3) will also be provided with access control.

The trust relationships in the common user repository may change over time, and the system administrator can implement these changes.

The trust relationships can be described by listings, numeric levels, text files or state-based relationships. The trust relationships enable a single common user repository to be created in a single (real or virtual) database rather than using separate databases with different access rights. This enables a more complete understanding of a user profile to be obtained, and kept up to date and consistent.

The access rights determined by the trust model determine not only access to hosted services but also to the data in the common user repository. For example, the trust model can be used to implement a system in which a subscriber (or other user) can access and modify data in the common user repository only if they have been authenticated by defined authentication credentials or authentication credentials determined by the trust model to be better.

The common user repository can be implemented as a single actual or virtual database. Alternatively, multiple databases can be used each containing a set of attributes. One of these databases may be a home location register or a home subscriber server as used in 2G and IMS networks. These databases are then linked by a further table (in another database) that includes references to indicate how a user is authenticated to each database. This table then identifies the trust relationships.

A status field can be used to indicate the state of a particular set of attributes, such as currently active, inactive or a permanent status.

A further refinement of the system is that any container, but most likely the web container 16, also includes a state machine to interpret the user's accessibility status. As mentioned above, Web service interactions are essentially synchronous in nature, and any state information is temporary in nature and is not generally utilized.

However, some state information can also be derived from web-based communications, concerning the dynamic status of a multiple transaction user session. This dynamic status information can also be placed in the common user repository. Thus, the common user repository can also include dynamic network based information about links and devices, and the dynamic state in a state model of the user session. This dynamic state is understood using a programmable state model.

The common user repository can thus provide additional state information derived from:
   all static interfaces;
   any SSO (single sign on) status;
   telecommunications network dynamic parameters such location;
   a model of the user's current interaction state;
   device or devices the user currently has enabled;
   information from the user.

A state machine, typically located in the web container, provides the model of the interaction state for any interactions by means of the web container. This model may for example include their location within a set of web pages being browsed, the devices of the user that are active, identification of the sessions that are running.

This information can be used by applications to ensure the best delivery of services.

A service delivery platform unit of the web container can be used to derive the state information. As an example, this information from the web container state machine can identify the best device to send data to, when a user has multiple devices. The same common user identity can be used for all devices, but the state based analysis of the status of multiple devices of a user can dictate the device to which a service should be delivered. For example, a color map should be sent to a PDA with a larger display in preference to a mobile telephone, if this PDA device is active.

The state machine can also be programmed to interpret user interactions. If, for example, a user has not used a device for 6 hours, should the system assume that the user is still available? For some cases, for example a static PC during work hours, it may be correct to assume that the user is in fact available, whereas the user is probably not available at the same static PC out of work hours. The user state must have rules to interpret inactivity. Rules for purposes such as timing out sessions and reroute requests can be added to the state table models. The state machine also takes account of the level of authentication of a user, by accessing information in the common user repository, in particular by determining which data set is or sets are active for the user.

Embodiments of the invention have been described in connection with an example of the application/service delivery system for a mobile telephony network operator. The significance of this application is that many different types of service are provided to many different users, and with different access rights and authentication protocols being used for different services. There are other technical arenas in which the same issues may arise, and various aspects used in the system described above can be applied to other contexts. These include fixed and broadband networks.

One example of system has been described above, and which embodies one embodiment of the invention as claimed.

The system has been described only in sufficient detail to enable a full understanding of the concepts underlying embodiments of the invention. Other features will be required to implement a practical control system, and these will be apparent to those skilled in the art. However, a brief discussion of key additional features is provided below.

The common management and billing unit has not been described above. This can be conventional, and will include a billing module, an asset management module, customer relationship management module, as well as a policy control unit. Management and billing may use the services provided in each container and may be made available as services in each container.

The system will additionally comprise an IP switching fabric unit, and messaging service units, for example a short messaging service unit, which will again be conventional. SIP protocols may be used on the IP switching fabric inside, as well as outside of the application/service delivery system.

The common user identity used by the system does not necessarily need to be a new identity. For example the MSISDN number may be used as the common user repository single identity.

The system has been described above in connection with users of the system with mobile telephones or PDA devices. However, the "users" may be automated devices. For example, the services provided by the system may include such functions as taking meter readings, providing traffic data to a car navigation system, such as congestion data or routing data. The "user" can then be an electricity meter or a car navigation system. However, the principles of service delivery as outlined above remain the same.

Figure 10:
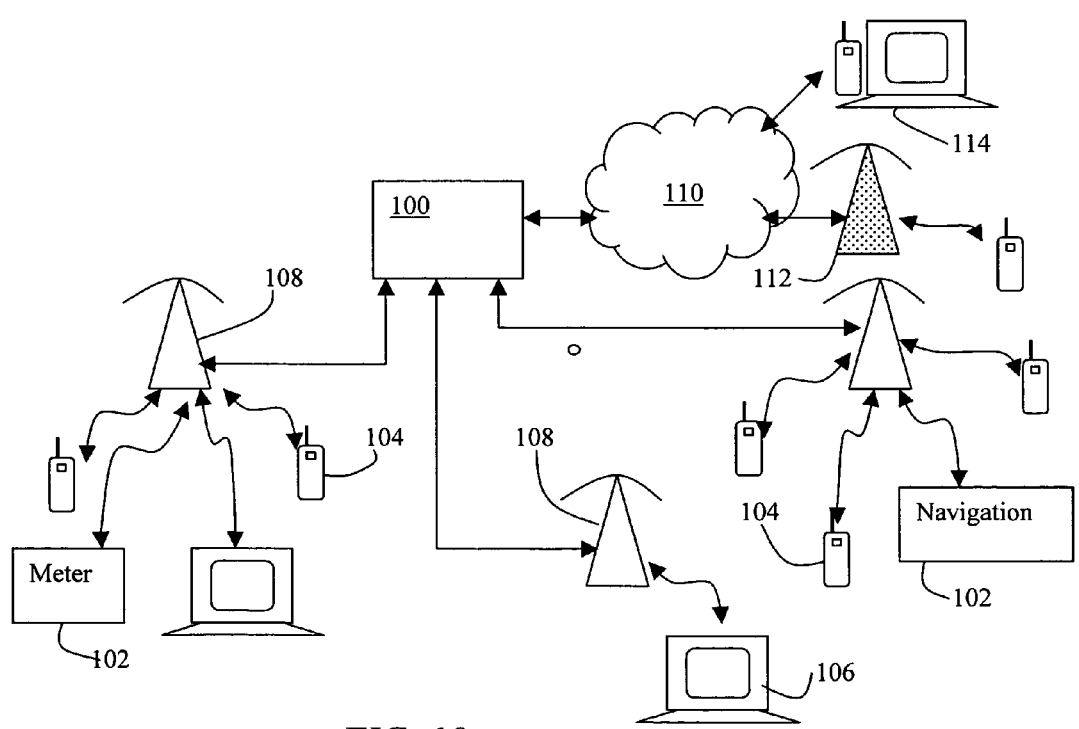
FIG. 10 shows a complete mobile telephony network of one embodiment of the invention including the users of the network.

For completeness, FIG. 10 shows a complete system, using the system 100 described above to provide services to multiple users, including automated users 102 (such as a meter or navigation system) and human users with telephones 104 or computer terminals 106. The system 100 is linked to a network of base stations 108 which provide the mobile network coverage, and also links to the internet 110. FIG. 10 also shows a wireless LAN base station 112 as well as a wired terminal 114 connecting to the internet 110.

The scope of the present disclosure should of course be determined with reference to the accompanying claims rather than the specific example described above. The specific example may, accordingly, be modified without departing from the spirit and scope of the present disclosure.

We claim:

1. A system for providing services to subscribers of a network, wherein the system supports the provision of a plurality of different services to multiple subscribers, and comprises:
   a first processing unit in a service delivery system of a network operator of the network and which provides a first execution environment for a first set of software applications for providing respective services over the network from service units external to the service delivery system to subscribers;
   a second processing unit in the service delivery system of the network operator and which provides a second execution environment for a second set of software applications for providing respective services from service units to subscribers;
   a data structure for storing data associated with a plurality of subscribers, wherein data associated with each of said plurality of subscribers comprises a plurality of sets of data, each set of data for a subscriber relating to a respective different authentication process and to a respective level of authentication; and
   a trust model comprising a set of relationships between the sets of data, wherein the trust model determines the access rights of subscribers to different services hosted by the different processing units in dependence on the data set which has been used to authenticate the subscriber in a given subscriber session, wherein the trust model defines progressively increasing levels of trust wherein authentication of a subscriber using one of the sets of data at a first level of trust authorizes the subscriber to access services which require the first level of trust or lower to be met during authentication;
   wherein the first set of software applications are each associated with a first service binding or first set of service bindings, the second set of software applications are each associated with a different second service binding or second set of service bindings, and wherein the system further comprises a second data structure containing data identifying the first and second sets of software applications or software application components of the first and second sets of software applications, and further identifies the service binding or bindings associated with each application or application component.

2. The system as claimed in claim 1, wherein the data structure provides a common identity for association with a subscriber.

3. The system as claimed in claim 2, wherein the common identity is recognized by all processing units of the system.

4. The system as claimed in claim 2, wherein the data structure stores all data associated with each subscriber from each processing unit.

5. The system as claimed in claim 2, wherein the system comprises a plurality of access control points, and wherein each access control point is provided with a traffic interceptor for appending the common identity of a subscriber to a service request from the subscriber.

6. The system as claimed in claim 5, wherein the system further comprises a plurality of gateways between the processing units, for controlling the passage of data between respective pairs of processing units, and wherein each gateway is provided with an access control point.

7. The system as claimed in claim 1, wherein the network comprises a mobile telephony network.

8. The system as claimed in claim 7, wherein the mobile telephone network comprises a plurality of base stations connected to the system for communicating with multiple subscribers over a wireless connection.

9. The system as claimed in claim 1, further comprising a third processing unit which provides a third execution environment for a third set of software applications, each associated with a different third service binding or third set of service bindings, and wherein the second data structure contains data identifying the third set of software applications or software application components of the third set, and further identifies the service binding or bindings associated with each application or application component of the third set.

10. The system as claimed in claim 9, wherein different developers are provided with different access rights to the data in the second data structure.

11. The system as claimed in claim 10, wherein the access rights are dependent on the trust levels associated with the developers.

12. The system as claimed in claim 11, further comprising a read interface for enabling a developer to access the data in the second data structure, and wherein the read interface comprises a plurality of interface units, each associated with a specific software development environment.

13. The system as claimed in claim 12, wherein each interface unit provides information for updating the software development environment to provide a listing of the data available based on the access rights associated with the software development environment.

14. The system as claimed in claim 1, wherein the trust model further determines access rights to data in the data structure.

15. A method of controlling access to services provided by a network operator, the network operator using a system which supports the provision of a plurality of different services to multiple subscribers, the method comprising:
  receiving a service request from a subscriber for services hosted by a first processing unit or a second processing unit, wherein the first processing unit is of a service delivery system of the network operator and provides a first execution environment for a first set of software applications for providing respective services over the network from service units distinct from the service delivery system to subscribers, and the second processing unit is of the service delivery system of the network operator and provides a second execution environment for a second set of software applications for providing respective services, wherein the first set of software applications are each associated with a first service binding or first set of service bindings, and the second set of software applications are each associated with a different second service binding or second set of service bindings;
  interrogating a data structure which stores data associated with a plurality of subscribers, the data associated with each of said plurality of subscribers comprising a plurality of sets of data, each set of data within the plurality of sets of data for a subscriber relating to a respective different authentication process and to a respective level of authentication;
  interrogating a second data structure containing data identifying the first and second sets of software applications or software application components of the first and second sets of software applications, and further identifies the service binding or bindings associated with each application or application component;
  using a trust model comprising a set of relationships between the sets of data to determine access rights of the subscriber to the service requested; and
  permitting or prohibiting access to the service requested based on the trust model and on the data set which has been used to authenticate the subscriber in the subscriber session, wherein the trust model defines progressively increasing levels of trust wherein authentication of a subscriber using one of the sets of data at a first level of trust authorizes the subscriber to access services which require the first level of trust or lower to be met during authentication.

16. The method as claimed in claim 15, wherein receiving a service request from a subscriber comprises receiving the request at a gateway within the system, the request using first identification information for the subscriber.

17. The method as claimed in claim 16, wherein the data structure provides a common identity for association with a subscriber which is recognized by all processing units of the system, and wherein the method further comprises, at the gateway, associating the common identity with the request and forwarding the request to the processing unit associated with the request.

18. The method as claimed in claim 17, wherein the system comprises a plurality of access control points, and wherein the method further comprises, at any access control point at which the request from the subscriber is initially received, appending the common identity of the subscriber to the request.

19. A non-transitory computer readable medium comprising machine-readable instructions that, when executed, to direct a system to:
  receive a service request from a subscriber for services hosted by a first processing unit or a second processing unit, wherein the first processing unit provides a first execution environment for a first set of software applications for providing respective services and the second processing unit provides a second execution environment for a second set of software applications for providing respective services, and wherein the first processing unit and the second processing unit are both disposed in a same delivery system of the network operator, and wherein the first set of software applications are each associated with a first service binding or first set of service bindings, and the second set of software applications are each associated with a different second service binding or second set of service bindings;
  interrogate a data structure that stores data associated with a plurality of subscribers of the system, wherein data associated with each of said plurality of subscribers of the system comprises a plurality of sets of data, each set of data for a subscriber containing user information associated with a respective different authentication process, and each set of data relating to a respective level of authentication;
  interrogate a second data structure containing data identifying the first and second sets of software applications or software application components of the first and second sets of software applications to identify the service binding or bindings associated with each application or application component;
  use a trust model comprising a set of relationships between the sets of data to determine access rights of subscribers to different services hosted by different processing units in dependence on the data set which has been used to authenticate the subscriber in a given subscriber session;
  wherein the trust model defines progressively increasing levels of trust wherein authentication of a subscriber using one of the sets of data at a first level of trust authorizes the subscriber to access services which require the first level of trust or lower to be met during authentication.

* * * * *